March 14, 1944.　　　H. PELPHREY　　　2,344,323
TOOTH RELIEVING MACHINE
Filed Oct. 24, 1940　　　2 Sheets-Sheet 1
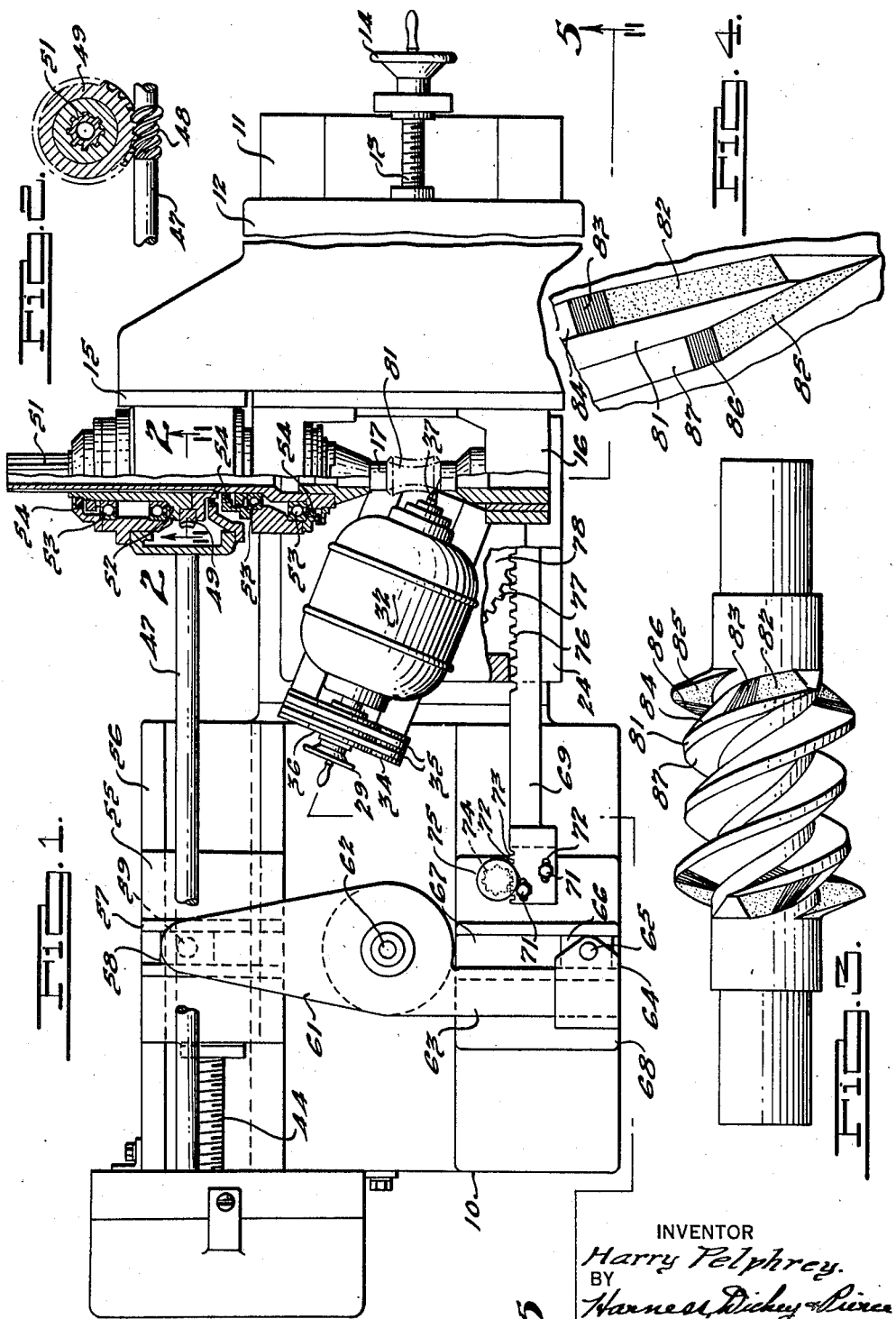
INVENTOR
Harry Pelphrey.
BY
Barnes, Dickey & Pierce
ATTORNEYS.

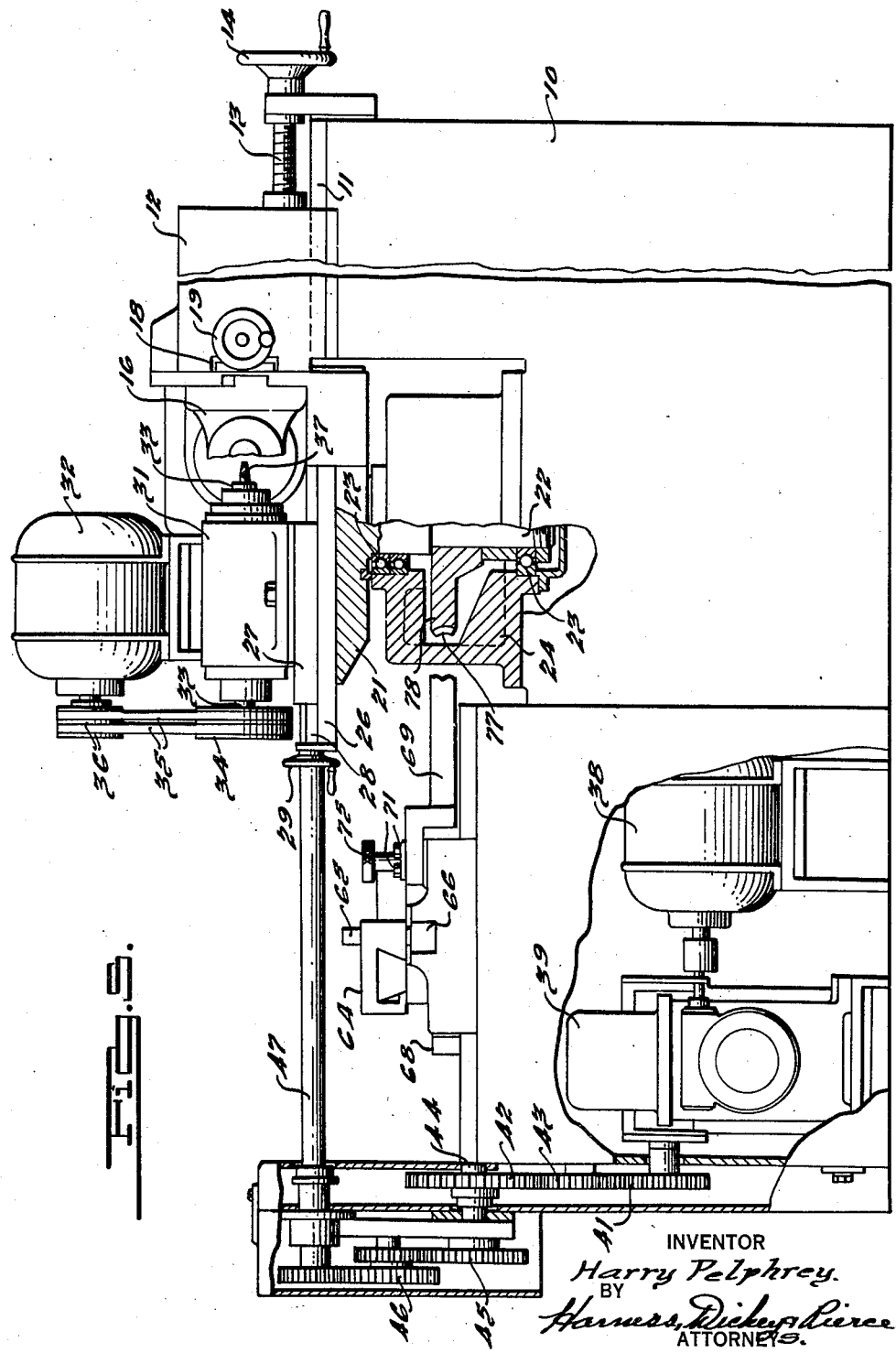

Patented Mar. 14, 1944

2,344,323

UNITED STATES PATENT OFFICE 2,344,323

TOOTH RELIEVING MACHINE

Harry Pelphrey, Detroit, Mich.

Application October 24, 1940, Serial No. 362,489

4 Claims. (Cl. 90—3)

My invention relates to worm cutting and relieving machinery, and particularly to a machine which is universal in operation for cutting worms, and for relieving the ends of both flanks of a thread of a worm in a desirable manner.

Difficulty has always been experienced in the worm gear art, particularly in the art of manufacturing the Hindley type of worm, due to interference at the ends of the worm thread with the worm wheel teeth. The Hindley type of worm being of the enveloping type, is of hour glass shape, following the circumference of the worm wheel. The teeth of the wheel are concave at the crown, to envelope the threads of the worm. Considerable development was required to produce this type of worm set. It was found that the machining of the elements of the set must occur in their central plane, with tools having straight cutting edges disposed tangent to the hypothetical base circle, the diameter of which limits the worm length. That is to say, a material interference results if the length of the worm is greater than the diameter of the base circle referred to. As it is preferable to have the worm at maximum length, it was found, to produce proper initial mating between the teeth of the worm wheel and the thread of the worm, that it is desirable to relieve the sides of the worm threads at both the leading and trailing ends.

The present machine pertains to the relieving of the threads by initially removing a material amount of stock at both ends of the thread and blending the relieved area with the thread flank. This blended relieved area may vary only .005 of an inch from the relief portion permitting the contact to occur without a sudden loading of the thread or teeth through the progressive engagement therebetween. The novelty residing in this particular type of worm element is that of providing surface contact between the thread faces and those of the teeth which produces a "wearing-in" rather than a "wearing-out" effect as occurs in the standard type of worms having a point or line contact between the mated surfaces. The machine herein illustrated and described is so constructed as to be able to accurately machine the threads of the worm as well as producing the relieved ends mentioned specifically hereinabove.

Accordingly, the main objects of my invention are; to provide a machine which is universal in application for machining the thread of worms of the enveloping type and for producing a predetermined relief on the thread ends thereof; to relieve the ends of worm threads by machining the ends thereof on a lead different from that of the thread and thereafter joining the relief portion of the thread faces by a finer relieved portion which blends therewith; to produce a worm of the enveloping type having the ends of the threads cut away and having the cut away portion blended into the thread flanks; to provide a machine for cutting worm elements by first machining the threads of the elements on a predetermined helix and thereafter machining a predetermined relief on the ends of the thread sides on different helical angles; and in general, to provide a machine for machining and relieving worm gears which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a plan view, partly in section, of a machine for cutting worms embodying features of my invention;

Fig. 2 is a sectional view of the structure illustrated in Fig. 1, taken on the line 2—2 thereof;

Fig. 3 is an enlarged view in elevation of the worm as machined by the device illustrated in Fig. 1;

Fig. 4 is an enlarged broken view of the end of a thread of the worm illustrated in Fig. 3; and Fig. 5 is a sectional view of the structure illustrated in Fig. 1, taken on the line 5—5 thereof.

Referring to Figures 1 and 5, the machine embodies a bed 10 having ways 11 on which a head 12 is movable by a lead screw 13 operated by a hand wheel 14. The head is provided with a head stock 15 and a tail stock 16 in which a workpiece 17 is mounted for rotational movement. The head and tail stocks are adjustable in ways 18, the latter by a lead screw operated by a hand wheel 19. A rotatable table 21 is mounted on a shaft 22 which is supported by bearings 23 in the housing 24 mounted on the base 10. The table has ways 26 on which a slide 27 is mounted for movement toward and away from the workpiece 17 by a lead screw 28 operated by a hand wheel 29. The slide 27 carries a bearing housing 31 on which a motor 32 is mounted. A spindle 33 is mounted in the bearing housing 31 and is driven by a pair of pulleys 34, belts 35 and pulleys 36 from the motor 32. A tool 37 is driven by the spindle 33 to machine the workpiece 17 as it is rotated.

Within the base of the machine, a motor 38 drives a speed reducing unit 39 which operates a spur gear 41. The spur gear drives a gear 42 through an idler gear 43 which gear 42 is attached to and drives a shaft 44 on the projecting end of which a gear 45 operates through a train of gears 46 to drive a shaft 47. The shaft 47 is provided with a worm 48 as illustrated in Fig. 2, disposed in mesh with a worm wheel 49 mounted on a spline shaft 51 which is attached to and drives the workpiece 17. The shaft 51 and a hub 52 supporting the wheel 49 are mounted in suitable bearings 53 which are sealed within the bearing housing by elements 54.

The shaft 44 has threads which mate with a nut, not herein illustrated, attached to the underside of a slide 55 which is mounted on ways 56 on the bed of the machine. The slide 55 has ways 57 thereon in which a block 58 is mounted for sliding movement and connected by a pin 59 to an arm 61 mounted on a pivot 62. The arm 61 has an extension 63 on the opposite side of the pivot 62 on which a collar 64 is mounted for movement toward and away from the pivot. A pin 65 on the collar 64 engages a block 66 which is disposed in a slot 67 in a slide 68 which is also mounted on the base of the machine. A rack 69 is adjustably supported on the slide 68 by bolts 71 which extend through slots 72 in the rack. Gear teeth 73 are provided in the end of the rack adjacent the slots 72 in mesh with a pinion 74 having an adjusting knob 75 thereon. The teeth 76 of the rack mesh with the teeth 77 of a gear wheel 78 which is fixed to the shaft 22 of the table 21.

When a worm 17 is to be machined, it is attached to the head stock 15 and tail stock 16 in driving relation with the shaft 51. The shaft 47 is driven by the motor 38 to drive the worm in rotation about its axis. The operation of the motor also drives the lead screw 44 in synchronized relation with the driving of the shaft 47 controlled by the change gears 46. The operation of the lead screw 44 produces the movement of the slide 55 and the movement of the arm 61 and its extension 63 about the pivot 62. The collar 64 is adjusted on the arm 63 to produce a movement to the slide 68 proportional to that of the slide 55 to thereby advance the rack 69 proportionally to rotate the gear wheel 78 and therefore the table 21. The rotation of the table produces the movement of the tool 57 across the face of the worm 17 to machine the threads thereof. As pointed out hereinabove, through the adjustment of the slide 27 and the head 12, the center distance between the worm and the tool is adjusted to conform to the center distance of the finish worm and the worm wheel.

Referring to Fig. 3, the helix angle of the thread 81 will depend upon the relationship of the block 64 on the arm 63 to the fixed arm 61. After the threads are cut in this manner, a further adjustment of the block 64 provides a relative movement to the tool and worm on a different helix angle for relieving the end of one side of the thread. Thus, for example, referring to Fig. 4, one adjustment would produce the heavy relief 82 on the end of the thread 81 while a further adjustment will produce the machining at 83 to blend the relief 82 into the flank 84. The further adjustment of the block 64 on the arm 63 will produce a movement to the tool to relieve the offset side of the thread at 85 and a further adjustment produces the machining of the portion 86 which blends the relieved portion 85 with the flank 87. Further adjustment produces the dubbing off and relieving of the ends of both sides of the thread at opposite ends of the worm, and it will thus be seen that the machine is quite universal in application. Not only are threads of any helix angle on worms having different center relation with worm wheels machined by the device, but the ends of the threads of the worms may be cut to eliminate interference and to have the engagement occur gradually to eliminate any strains on the teeth or threads and unnecessary sound.

While I have described and illustrated but a single embodiment of my invention, it will be apparent to those skilled in the art that various changes, omissions, additions and substitutions may be made therein without departing from the spirit and scope of my invention, as set forth in the accompanying claims.

What is claimed is:

1. In a machine for relieving the flanks of the thread of a globoidal type worm, a support for the worm, means for rotating said support, a rotatable table mounted for rotation upon an axis coinciding with the axis of the wheel with which the worm is adapted to mesh, a reciprocable rack member for rotating said table, a feed screw, means for rotating said feed screw synchronously with rotation of said worm and a lever mechanism interconnecting said feed screw and rack member to effect rotation of said table synchronously with said worm, but at a speed different from the speed of rotation of the worm wheel with which said worm is adapted to mesh.

2. In a machine for relieving the flanks of the thread of a globoidal type worm, a support for the worm, means for rotating said support, a rotatable table mounted for rotation upon an axis coinciding with the axis of the wheel with which the worm is adapted to mesh, a reciprocable rack member for rotating said table, a feed screw, means for rotating said feed screw synchronously with rotation of said worm and adjustable means interconnecting said feed screw and rack member to cause rotation of said table at a predetermined rate with respect to rotation of said worm and at a rate different from the rate of rotation of the wheel with which said worm is adapted to mesh.

3. In a machine for relieving the flanks of the thread of a worm of the globoidal type including a spindle for supporting said worm, means for rotating said spindle, a rotatable table adjustably mounted with respect to said worm, said table being rotatable about an axis coinciding with the axis of the worm wheel with which said worm is adapted to be meshed, a reciprocable rack member serving to effect rotation of said table, a cutting tool mounted on said table adapted to machine one flank of the thread of the worm, a lead screw driven synchronously with rotation of said worm, a lever interconnecting a block on said lead screw with said rack member whereby longitudinal movement of said block will effect longitudinal movement of said rack member and thereby effect a synchronous rotation of said table with the rotation of the worm being operated upon.

4. In a machine for relieving the flanks of the thread of a worm of the globoidal type including a spindle for supporting said worm, means for rotating said spindle, a rotatable table adjustably mounted with respect to said worm, said table being rotatable about an axis coinciding with the axis of the worm wheel with which said worm is adapted to be meshed, a reciprocable rack member serving to effect rotation of said table, a cutting tool mounted on said table adapted to machine one flank of the thread of the worm, a lead screw driven synchronously with said spindle and a block carried by a nut on said lead screw connected with said rack whereby longitudinal movement of said block will effect longitudinal movement of said rack member and thereby effect a synchronous rotation of said table with the rotation of the worm being operated upon, and adjustable means for varying the effective length of said lever whereby to vary the ratio of rotation between said table and said worm.

HARRY PELPHREY.